(12) United States Patent
Abrishamkar et al.

(10) Patent No.: US 6,744,749 B2
(45) Date of Patent: Jun. 1, 2004

(54) METHOD AND APPARATUS FOR PILOT ESTIMATION USING A WIENER FILTER

(75) Inventors: Farrokh Abrishamkar, San Diego, CA (US); Brian K. Butler, La Jolla, CA (US); Yu-Chuan G. Lin, Carlsbad, CA (US)

(73) Assignee: Qualcomm, Incorporated, San Diego, CA (US)

(*) Notice: Subject to any disclaimer, the term of this patent is extended or adjusted under 35 U.S.C. 154(b) by 68 days.

(21) Appl. No.: 10/262,010

(22) Filed: Sep. 30, 2002

(65) Prior Publication Data

US 2003/0227886 A1 Dec. 11, 2003

Related U.S. Application Data

(60) Provisional application No. 60/386,964, filed on Jun. 5, 2002.

(51) Int. Cl.$^7$ ................................................. H04B 7/216
(52) U.S. Cl. ...................... 370/335; 370/342; 370/441
(58) Field of Search ............................... 370/328, 335, 370/342, 441, 319, 320, 479

(56) References Cited

U.S. PATENT DOCUMENTS

| | | |
|---|---|---|
| 4,901,307 A | 2/1990 | Gilhousen et al. |
| 5,101,501 A | 3/1992 | Gilhousen et al. |
| 5,103,459 A | 4/1992 | Gilhousen et al. |
| 5,740,208 A | 4/1998 | Hulbert et al. ............... 375/346 |
| 5,764,687 A | 6/1998 | Easton |

OTHER PUBLICATIONS

Baltersee J. et al: "Performance Analysis of Phasor Estimation Algorithms For A FDD–UMTS Rake Receiver", IEEE, vol. 2, Sep. 6, 2000, pp. 476–478, figures 1,3.

*Primary Examiner*—Chi Pham
*Assistant Examiner*—Anh-Vu H Ly
(74) *Attorney, Agent, or Firm*—Philip R. Wadsworth; Charles D. Brown; Nicholas J. Pauley

(57) ABSTRACT

A system is disclosed for use in a wireless communication system to provide an estimated pilot signal. The system includes a receiver and a front-end processing and despreading component in electronic communication with the receiver for despreading a CDMA signal. A pilot estimation component is in electronic communication with the front-end processing and despreading component for estimating an original pilot signal using a Wiener filter to produce a pilot estimate. A demodulation component is in electronic communication with the pilot estimation component and the front-end processing and despreading component for providing demodulated data symbols. The Wiener filter is configured by an offline filter determination process that calculates parameters of the Wiener filter to minimize the mean-square error.

4 Claims, 7 Drawing Sheets

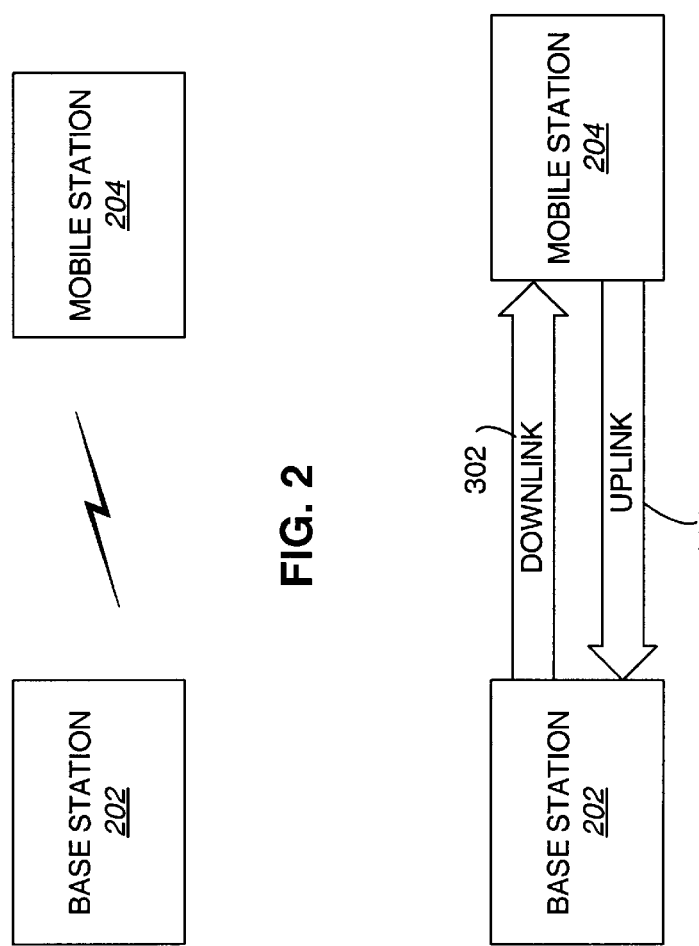

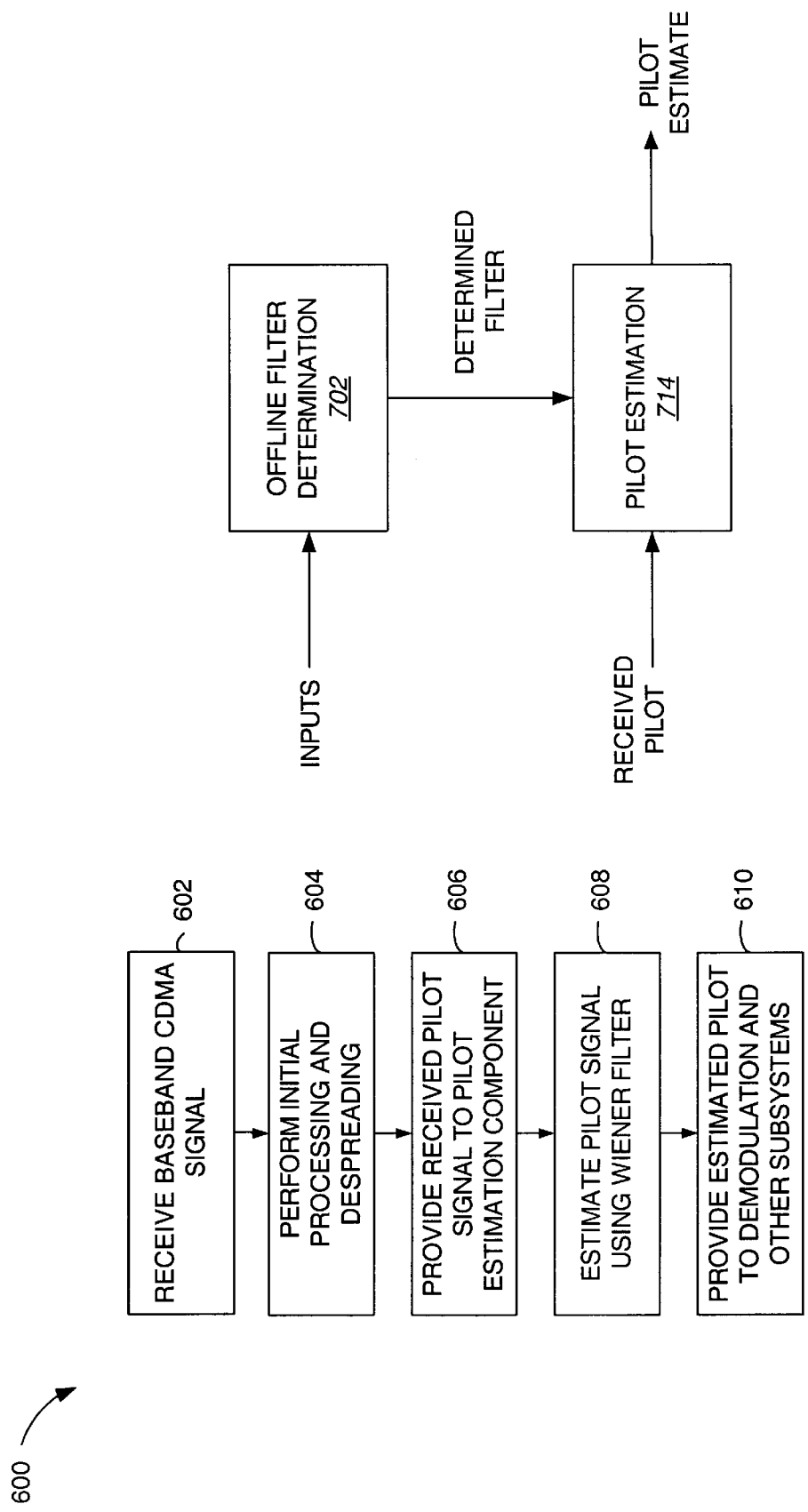

METHOD AND APPARATUS FOR PILOT ESTIMATION USING A WIENER FILTER

RELATED APPLICATIONS

Claim of Priority Under 35 U.S.C. §119(e)

The present Application for Patent claims priority of U.S. Provisional Application No. 60/386,964, filed Jun. 5, 2002, assigned to the assignee hereof and hereby expressly incorporated by reference herein.

REFERENCE TO CO-PENDING APPLICATIONS FOR PATENT

The present invention is related to the following Applications for Patent in the U.S. Patent & Trademark Office:

"Method And Apparatus For Pilot Estimation Using Suboptimum Expectation Maximization" by Farrokh Abrishamkar et al., having Attorney Docket No. 020123, filed concurrently herewith and assigned to the assignee hereof;

"Method And Apparatus For Pilot Estimation Using A Prediction Error Method With A Kalman Filter And Pseudo-Linear Regression", by Farrokh Abrishamkar et al., having Attorney Docket No. 020201, filed concurrently herewith and assigned to the assignee hereof;

"Method And Apparatus For Pilot Estimation Using A Prediction Error Method With A Kalman Filter And A Gauss-Newton Algorithm," by Farrokh Abrishamkar et al., having Attorney Docket No. 020205, filed concurrently herewith and assigned to the assignee hereof; and "Method And Apparatus For Pilot Estimation Using An Adaptive Prediction Error Method With a Kalman Filter and A Gauss-Newton Algorithm," by Farrokh Abrishamkar et al., having Attorney Docket No. 020232, filed concurrently herewith and assigned to the assignee hereof.

FIELD

The present invention relates to wireless communication systems generally and specifically, to methods and apparatus for estimating a pilot signal in a code division multiple access system.

BACKGROUND

In a wireless radiotelephone communication system, many users communicate over a wireless channel. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The CDMA technique has many advantages. An exemplary CDMA system is described in U.S. Pat. No. 4,901,307, entitled "Spread Spectrum Multiple Access Communication System Using Satellite Or Terrestrial Repeaters", issued Feb. 13, 1990, assigned to the assignee of the present invention, and incorporated herein by reference. An exemplary CDMA system is further described in U.S. Pat. No. 5,103,459, entitled "System And Method For Generating Signal Waveforms In A CDMA Cellular Telephone System", issued Apr. 7, 1992, assigned to the assignee of the present invention, and incorporated herein by reference.

In each of the above patents, the use of a forward-link (base station to mobile station) pilot signal is disclosed. In a typical CDMA wireless communication system, such as that described in EIA/TIA IS-95, the pilot signal is a "beacon" transmitting a constant data value and spread with the same pseudonoise (PN) sequences used by the traffic bearing signals. The pilot signal is typically covered with the all-zero Walsh sequence. During initial system acquisition, the mobile station searches through PN offsets to locate a base station's pilot signal. Once it has acquired the pilot signal, it can then derive a stable phase and magnitude reference for coherent demodulation, such as that described in U.S. Pat. No. 5,764,687 entitled "Mobile Demodulator Architecture For A Spread Spectrum Multiple Access Communication System," issued Jun. 9, 1998, assigned to the assignee of the present invention, and incorporated herein by reference.

Recently, third-generation (3G) wireless radiotelephone communication systems have been proposed in which a reverse-link (mobile station to base station) pilot channel is used. For example, in the currently proposed cdma2000 standard, the mobile station transmits a Reverse Link Pilot Channel (R-PICH) that the base station uses for initial acquisition, time tracking, rake-receiver coherent reference recovery, and power control measurements.

Pilot signals can be affected by noise, fading and other factors. As a result, a received pilot signal may be degraded and different than the originally transmitted pilot signal. Information contained in the pilot signal may be lost because of noise, fading and other factors.

There is a need, therefore, to process the pilot signal to counter the effects of noise, fading and other signal-degrading factors.

BRIEF DESCRIPTION OF THE DRAWINGS

FIG. 2 is a block diagram of a base station and a mobile station in a communications system.

FIG. 3 is a block diagram illustrating the downlink and the uplink between the base station and the mobile station.

FIG. 4 is a block diagram of the channels in an embodiment of the downlink.

FIG. 6 is a flow diagram of one embodiment of a method for estimating the pilot using a Wiener filter.

FIG. 7 is a block diagram illustrating the use of an offline filter determination component to determine the parameters of the Wiener filter.

DETAILED DESCRIPTION

Figure 1:
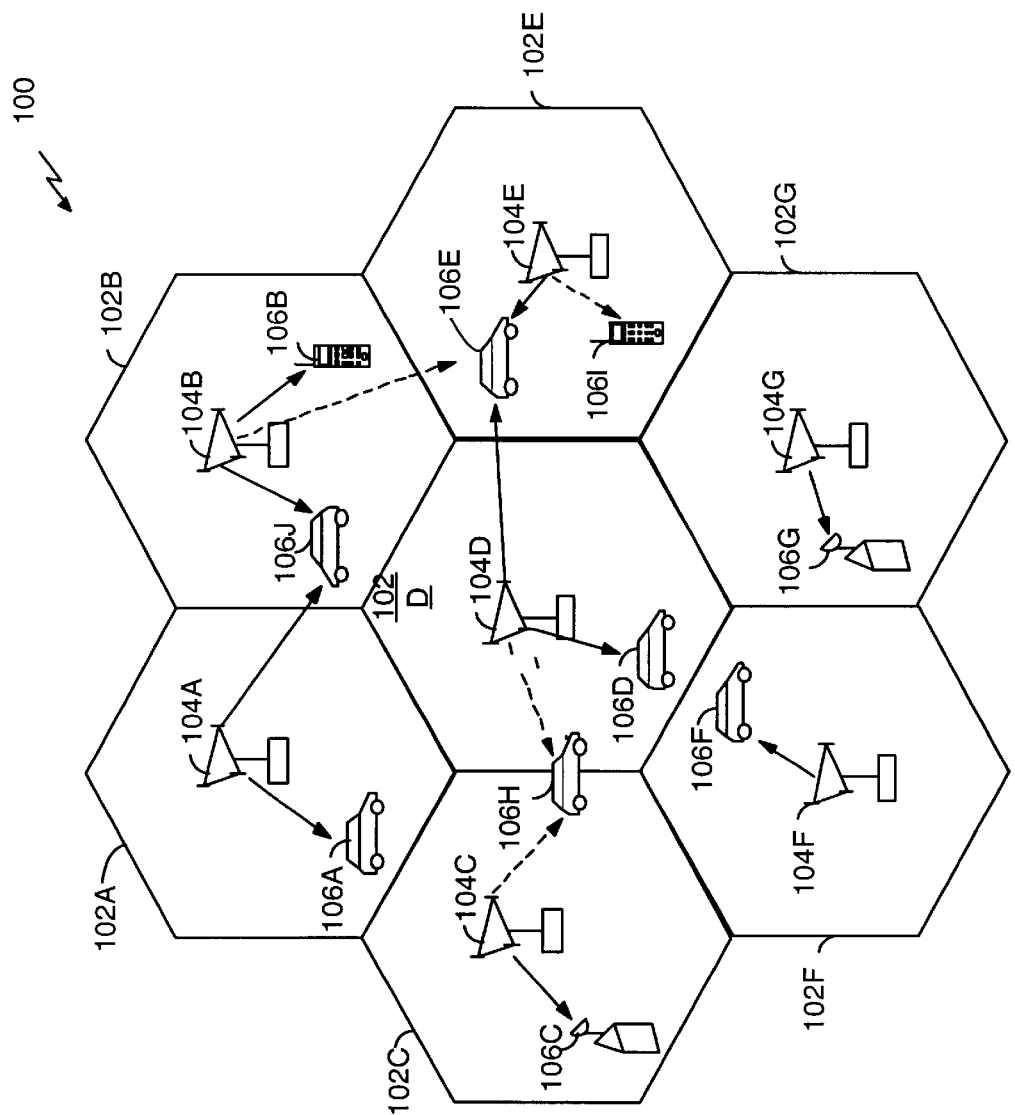
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments of a pilot estimator by first discussing a spread-spectrum wireless communication system. The use of a pilot signal in a spread-spectrum wireless communication system is discussed. Then components of an embodiment of a mobile station are shown in relation to providing a pilot estimate. Before the pilot is estimated, the parameters of a Wiener filter in the pilot estimation component are determined. Details regarding the offline filter determination component are set forth. Included in the specification relating to the offline filter determination are illustrations and mathematical derivations for minimizing the error. Conceptual and implementation block diagrams are discussed. Formulas for both offline filter determination and real-time pilot estimating are illustrated.

Note that the exemplary embodiment is provided as an exemplar throughout this discussion; however, alternate embodiments may incorporate various aspects without departing from the scope of the present invention.

The exemplary embodiment employs a spread-spectrum wireless communication system. Wireless communication systems are widely deployed to provide various types of communication such as voice, data, and so on. These systems may be based on CDMA, TDMA, or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the CDMA2000 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A–102G, each of which is serviced by a corresponding base station 104A–104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station 104 to the terminal 106, and the uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

FIG. 2 is a block diagram of the base station 202 and mobile station 204 in a communications system. A base station 202 is in wireless communications with the mobile station 204. As mentioned above, the base station 202 transmits signals to mobile stations 204 that receive the signals. In addition, mobile stations 204 may also transmit signals to the base station 202.

FIG. 3 is a block diagram of the base station 202 and mobile station 204 illustrating the downlink 302 and the uplink 304. The downlink 302 refers to transmissions from the base station 202 to the mobile station 204, and the uplink 304 refers to transmissions from the mobile station 204 to the base station 202.

FIG. 4 is a block diagram of the channels in an embodiment of the downlink 302. The downlink 302 includes the pilot channel 402, the sync channel 404, the paging channel 406 and the traffic channel 408. The downlink 302 illustrated is only one possible embodiment of a downlink and it will be appreciated that other channels may be added or removed from the downlink 302.

Although not illustrated, the uplink 304 may also include a pilot channel. Recall that third-generation (3G) wireless radiotelephone communication systems have been proposed in which an uplink 304 pilot channel is used. For example, in the currently proposed cdma2000 standard, the mobile station transmits a Reverse Link Pilot Channel (R-PICH) that the base station uses for initial acquisition, time tracking, rake-receiver coherent reference recovery, and power control measurements. Thus, systems and methods herein may be used to estimate a pilot signal whether on the downlink 302 or on the uplink 304.

Under one CDMA standard, described in the Telecommunications Industry Association's TIA/EIA/IS-95-A Mobile Stations-Base Station Compatibility Standard for Dual-Mode Wideband Spread Spectrum Cellular System, each base station 202 transmits pilot 402, sync 404, paging 406 and forward traffic 408 channels to its users. The pilot channel 402 is an unmodulated, direct-sequence spread spectrum signal transmitted continuously by each base station 202. The pilot channel 402 allows each user to acquire the timing of the channels transmitted by the base station 202, and provides a phase reference for coherent demodulation. The pilot channel 402 also provides a means for signal strength comparisons between base stations 202 to determine when to hand off between base stations 202 (such as when moving between cells).

Figure 5:
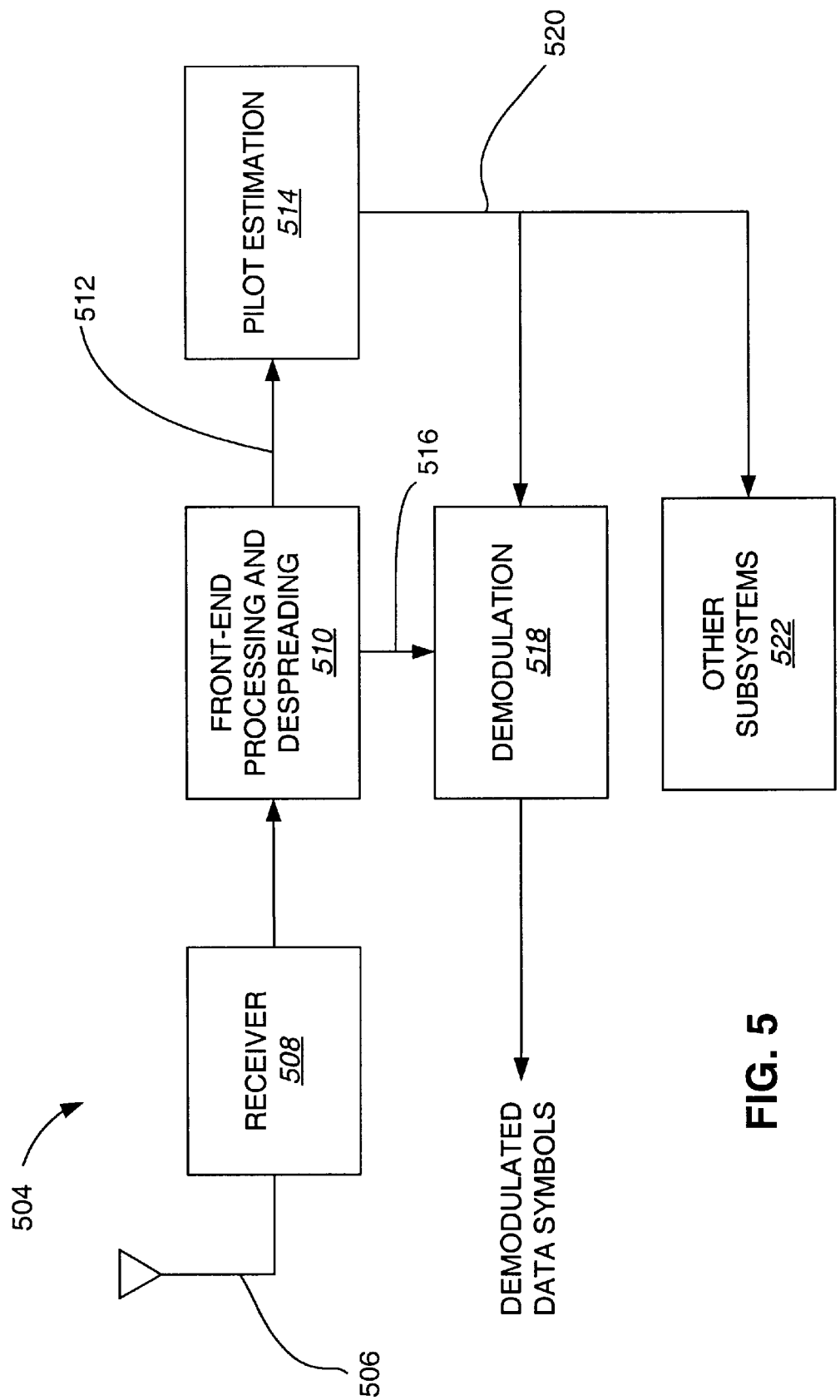
FIG. 5 illustrates a block diagram of certain components in an embodiment of a mobile station.

FIG. 5 illustrates a block diagram of certain components in an embodiment of a mobile station 504. Other components that are typically included in the mobile station 504 may not be illustrated for the purpose of focusing on the novel features of the embodiments herein. Many embodiments of mobile stations 504 are commercially available and, as a result, those skilled in the art will appreciate the components that are not shown.

If the pilot channel 402 were being sent on the uplink 304, the components illustrated may be used in a base station 202 to estimate the pilot channel. It is to be understood that the inventive principles herein may be used with a variety of components to estimate a pilot whether the pilot is being received by a mobile station 504, a base station 202, or any other component in a wireless communications system. Thus, the embodiment of a mobile station 504 is an exemplary embodiment of the systems and methods but it is understood that the systems and methods may be used in a variety of other contexts.

Referring again to FIG. 5, a spread spectrum signal is received at an antenna 506. The spread spectrum signal is provided by the antenna 506 to a receiver 508. The receiver 508 down-converts the signal and provides it to the front-end processing and despreading component 510. The front-end processing and despreading component 510 provides the received pilot signal 512 to the pilot estimation component 514. The received pilot signal 512 typically includes noise and usually suffers from fading.

The front-end processing and despreading component 510 also provides the traffic channel 516 to a demodulation component 518 that demodulates the data symbols.

The pilot estimation component 514 provides an estimated pilot signal 520 to the demodulation component 518. The pilot estimation component 514 may also provide the estimated pilot signal 520 to other subsystems 522.

It will be appreciated by those skilled in the art that additional processing takes place at the mobile station 504. The embodiment of the pilot estimation component 514 will be more fully discussed below. Generally, the pilot estimation component 514 operates to estimate the pilot signal and effectively clean-up the pilot signal by reducing the noise and estimating the original pilot signal that was transmitted.

Systems and methods disclosed herein use a Wiener filter to estimate the pilot signal. Wiener filters are known by those skilled in the art. In short, a Wiener filter is a solution of the linear minimum mean-squared waveform estimation problem for the case in which the noise and the signal are stationary random sequences. Many resources that include Wiener filter analysis and design are currently available.

FIG. 6 is a flow diagram 600 of one embodiment of a method for estimating the pilot using a Wiener filter. The system receives 602 the baseband CDMA signal. Then the front-end processing and despreading component 510 performs initial processing and despreading 604. The received pilot signal is then provided 606 to the pilot estimation component 514. The received pilot signal has been degraded by various effects, including noise and fading. The pilot estimation component 514 estimates 608 the pilot channel using a Wiener filter. After the pilot has been estimated 608, it is provided 610 to the demodulation component 518 as well as other subsystems 522.

Referring now to FIG. 7, before the Wiener filter in the pilot estimation component 514 is used, the parameters of the Wiener filter are determined. As shown, an offline filter determination component 702 is used to determine the parameters of the Wiener filter. Inputs are provided to the offline filter determination component 702 in order to determine the needed parameters. Once the parameters have been determined, they are provided to the pilot estimation component 714 and its Wiener filter, to process the received pilot and estimate the original pilot in real time. In the embodiment disclosed herein, the offline filter determination component 702 is used once to set up the parameters. After the parameters have been determined, the system uses the pilot estimation component 714 and no longer needs the offline filter determination component 702.

Typically the offline filter determination 702 is used before the pilot estimation component 714 is being used by the end user. For example, if the system and methods were being used in a mobile station 204, when an end user was using the mobile station 204, it 204 would be using the pilot estimation component 714 to process the pilot in real-time. The offline filter determination component 702 was used before the mobile station 204 was operating in real-time to determine the parameters needed to estimate the pilot.

The following discussion provides details regarding the calculations that will be made in the offline filter determination component 702 as well as the pilot estimation component 714. Additional details and derivations known by those skilled in the art are not included herein.

The received pilot complex envelope after despreading is given by the following formula:

$$\tilde{y}_k = \tilde{s}_k + \tilde{v}_k \qquad \text{Formula 1.}$$

The received complex envelope in Formula 1 is represented as $\tilde{y}_k$. The original but faded pilot signal is represented as $\tilde{s}_k$. The noise component is represented as $\tilde{v}_k$. For a single path mobile communication channel, the original pilot signal may be represented by the mathematical model found in Formula 2. The corresponding noise component may be represented by the formula found in Formula 3.

$$\tilde{s}_k = \rho_k e^{j\phi_k} R_{hh}(\tau) = g_k N \sqrt{E_c^p} R_{hh}(\tau) \tilde{f}_K \qquad \text{Formula 2.}$$

$$\tilde{v}_k = \qquad \text{Formula 3}$$

$$g_k \sqrt{NI_{oc}}\, \tilde{n}_k + g_k \sqrt{NI_{or}} \sum_{m=-\infty, m\neq k}^{+\infty} R_{hh}(mT_C - \tau)\tilde{w}_k.$$

The variables and parameters in the formulas found in Formulas 2 and 3 are given in Table 1.

TABLE 1

| | |
|---|---|
| $\sqrt{E_p}$: | Pilot Envelope |
| $I_{oc}$: | Total AWGN Noise |
| $I_{or}$: | Total Transmit PSD |
| $g_k$: | AGC Control Signal |
| $\rho_k$: | Rice (Rayleigh) Fade Process |
| $\tilde{f}_k$: | Complex Gaussian Fade Process with Clark Spectrum |
| $\phi_k$: | Fading Phase |

TABLE 1-continued

| m, k: | Chip and Symbol Counts |
| N: | Processing Gain |
| $R_{hh}(\tau)$: | Correlation |
| $\tau$: | Time Offset |
| $\tilde{n}_k, \tilde{w}_k$: | Zero Mean Unit Power Gaussian Noise |

The demodulation component 518 requires the phase of the pilot signal. In order to obtain the phase, the signals may be written in a form comprising I and Q components rather than being written in an envelope form. In Formula 4, $\tilde{y}$ represents the received pilot comprising its I and Q components. The faded pilot, without any noise, is represented as $\tilde{s}$ in Formula 5. The total noise is represented in Formula 6 as $\tilde{v}$. Formula 7 illustrates the fade as $\tilde{f}$.

$$\tilde{y}=y_I+jy_Q \qquad \text{Formula 4.}$$

$$\tilde{s}=s_I+js_Q \qquad \text{Formula 5.}$$

$$\tilde{v}=v_I+jv_Q \qquad \text{Formula 6.}$$

$$\tilde{f}=\rho e^{j\phi}=f_I+jf_Q \qquad \text{Formula 7.}$$

Given the relationships of the formulas above, the I and Q components of the faded pilot symbol without noise may be written as shown in Formulas 8 and 9.

$$s_I(k)=f_I(k)N\sqrt{E_c^p}R_{hh}(\tau)g(k) \qquad \text{Formula 8.}$$

$$s_Q(k)=f_Q(k)N\sqrt{E_c^p}R_{hh}(\tau)g(k) \qquad \text{Formula 9.}$$

Figure 8:
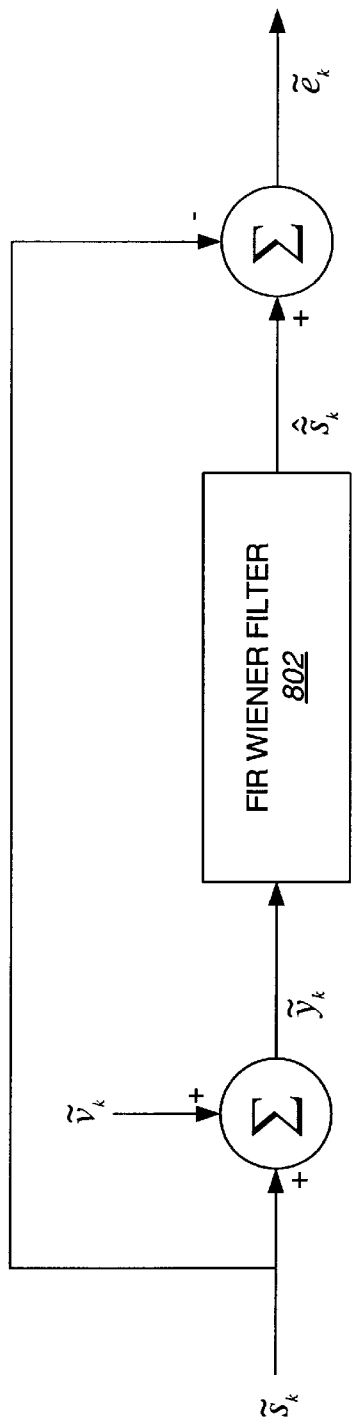
FIG. 8 is a conceptual block diagram illustrating the use of the Wiener filter to estimate the pilot and to minimize the difference between the original pilot and the estimated pilot.

FIG. 8 is a conceptual diagram illustrating the use of the Wiener filter 802 herein. As illustrated, and as shown in Formula 1, the received pilot $\tilde{y}_k$ is the result of the original but faded pilot signal $\tilde{s}_k$ being summed with the noise component $\tilde{v}_k$. The FIR Wiener filter 802 takes as input $\tilde{y}_k$ and outputs +e,cir s+ee $_k$ which is an estimate of $\tilde{s}_k$. The FIR Wiener filter 802 is designed to minimize the error $\tilde{e}_k$ between the estimate of the pilot and the pilot. The error signal $\tilde{e}_k$ is shown to be the difference between $$\hat{\tilde{s}}_k$$

and $\tilde{s}_k$, illustrated by a summer subtracting $\tilde{s}_k$ from $$\hat{\tilde{s}}_k.$$

Figure 9:
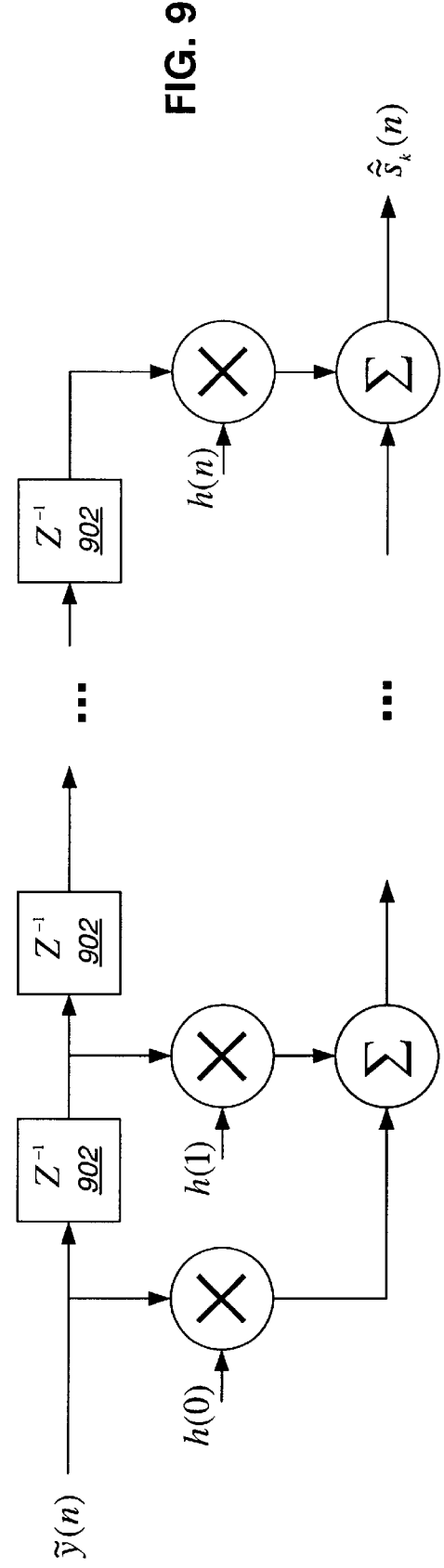
FIG. 9 is a block diagram illustrating an implementation of an FIR Wiener filter.

FIG. 9 is a block diagram illustrating an implementation of an FIR Wiener filter 802. As shown, the input to the filter is $\tilde{y}_k$ and the output is $$\hat{\tilde{s}}_k.$$

The input $\tilde{y}_k$ includes the present input sample as well as past samples, as indicated by the delay blocks 902. The output may be calculated according to the equation shown in Formula 10. The equation of Formula 10 may be written in matrix form as shown in Formula 11.

$$\hat{\tilde{s}}(n) = \sum_{k=0}^{n} h_k \cdot \tilde{y}(n-k). \qquad \text{Formula 10}$$

$$\hat{\tilde{s}}(n) = H \cdot Y(n). \qquad \text{Formula 11}$$

The Wiener filter is represented as H. It is understood by those skilled in the art that the mean-square error (MSE) is minimized according to the formula shown in Formula 12. Thus, the optimum Wiener filter for minimizing the error between $$\hat{\tilde{s}}_k$$

and $\tilde{s}_k$ is achieved by Formula 12. The Wiener filter transposed is shown in Formula 13.

$$H = R_{yy}^{-1}R_{ss} = R_{yy}^{-1}R_{ys}. \qquad \text{Formula 12}$$

$$H^T=[h_0,h_1,h_2,\ldots h_n] \qquad \text{Formula 13.}$$

$$R_{ss}=J_0(2\pi f_d T) \qquad \text{Formula 14.}$$

The parameter $R_{ss}$ is known from the Clark spectrum and is shown in Formula 14. The parameter $J_0$ is the spatial correlation of a component of the fade and may be the spatial correction of the I or Q component of the fade. $J_0$ is a modified Bessel Function, zeroth order, of the first kind. $f_d$ is the Doppler frequency.

As shown in Formula 13, H is an M×1 column vector. $R_{ys}$, $R_{ss}$ and $R_{yy}$ are all shown in Formulas 14–17. The term N is the processing gain. The function $R_{hh}(\tau)$ is the overall match filter input response not including the channel given as a function of $\tau$. $E_c^p$ is given and may be derived from the transmitted pilot.

$$R_{ys} = R_{ss} = \alpha^2 R_{ff} \gg \alpha^2 = N^2 E_c^p R_{hh}^2(\tau). \qquad \text{Formula 15}$$

$$R_{yy} = \begin{bmatrix} R_{ff}(0)+NN_t & R_{ff}(1) \\ R_{ff}(1) & R_{ff}(0)+NN_t \end{bmatrix}. \qquad \text{Formula 16}$$

$$R_{ss} = \begin{bmatrix} R_{ff}(0) \\ R_{ff}(1) \end{bmatrix}. \qquad \text{Formula 17}$$

The fading correlation per dimension is shown in Formula 18. The variables of Formula 18 are defined immediately after Formula 18. The initial total noise power $N_t$ is assumed for a most common geometry of the received signal across the cell.

$$R_{ff}(i)=J_0(2\pi f_d T_s i) \qquad \text{Formula 18.}$$

i=0,1

$$f_d = \frac{Vf_c}{C}: \text{Doppler}, \tau$$

Figure 10:
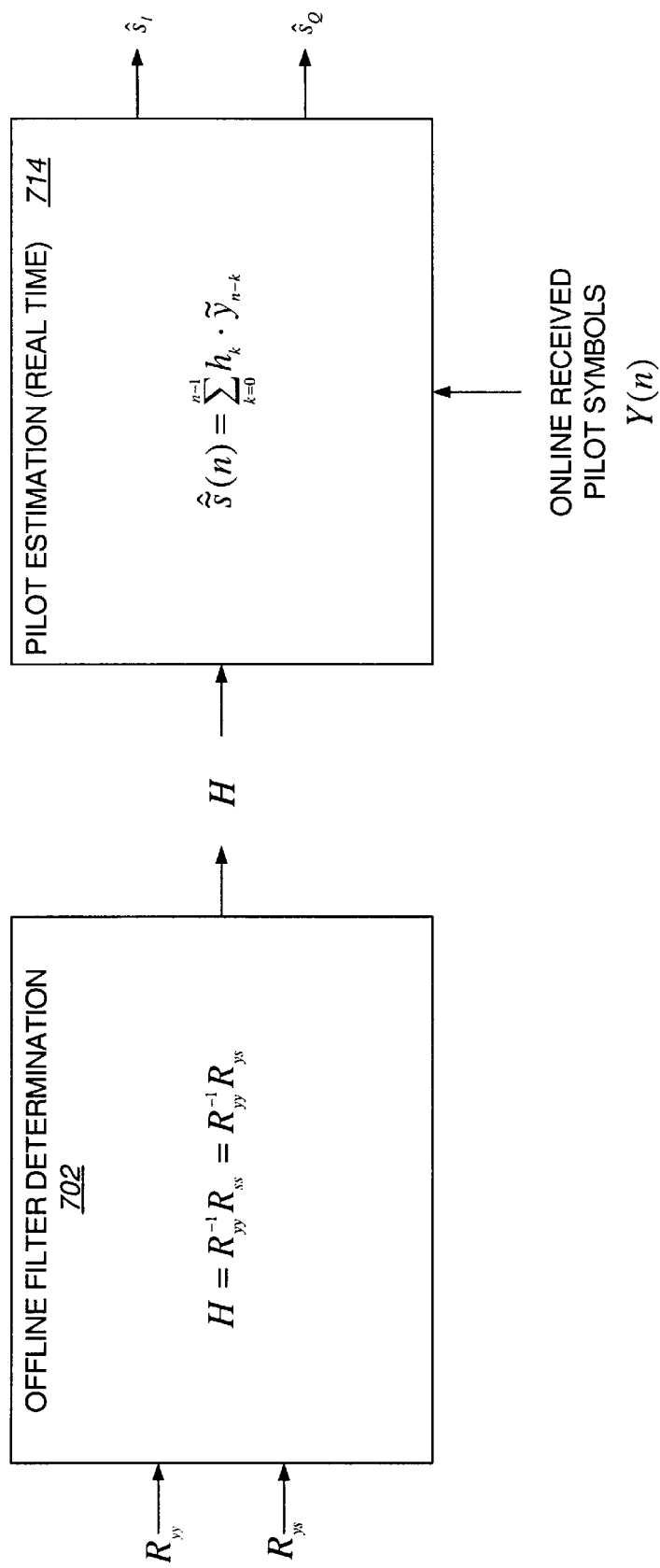
FIG. 10 is a block diagram illustrating the inputs to and outputs from the offline filter determination component and the real-time pilot estimation component.

$f_c$:carrier frequency
C:speed of light
$N_t$:total noise power
$T_s$:symbol time FIG. 10 is a block diagram of calculation blocks of FIG. 7 that illustrate the calculations made in each component. The offline filter determination component 702 performs the calculations as shown to determine the Wiener filter to be used in the pilot estimation (real time) component 714. The block diagram also illustrates the inputs to and outputs from the offline filter determination component 702 and pilot estimation component 714. The offline filter determination component 702 is provided the inputs $R_{ys}$ and $R_{yy}$. The Wiener filter H is determined by the calculation shown. The filter is tuned to a particular speed and signal-to-noise ratio. Typically the filter is tuned to a speed of approximately 100 km/hr and a signal-to-noise ratio of 0 dB. However, these values are only typical values and it will be appreciated by those skilled in the art that the filter may be tuned as desired.

After the offline filter determination component 702 has calculated the Wiener filter H, the Wiener filter H is ready for use by the pilot estimation component 714. The pilot estimation component 714 comprises the Wiener filter 802 operating in real-time. Thus, at this stage the Wiener filter 802 is fixed and is being used to estimate the pilot, given the received pilot as input. The output $$\hat{s}_k$$

is generated by the pilot estimation component 714.

As discussed above, the pilot estimation component 714 uses a Wiener filter to estimate the pilot. The calculations for the Wiener filter 802 operating in real-time are shown in FIG. 10 and are known by those skilled in the art. The Wiener filter 802 is provided the online received pilot symbols and estimates the pilot. As shown, the Wiener filter 802 included in the pilot estimation component 714 produces an estimate for both the I and Q components of the pilot signal.

Figure 11:
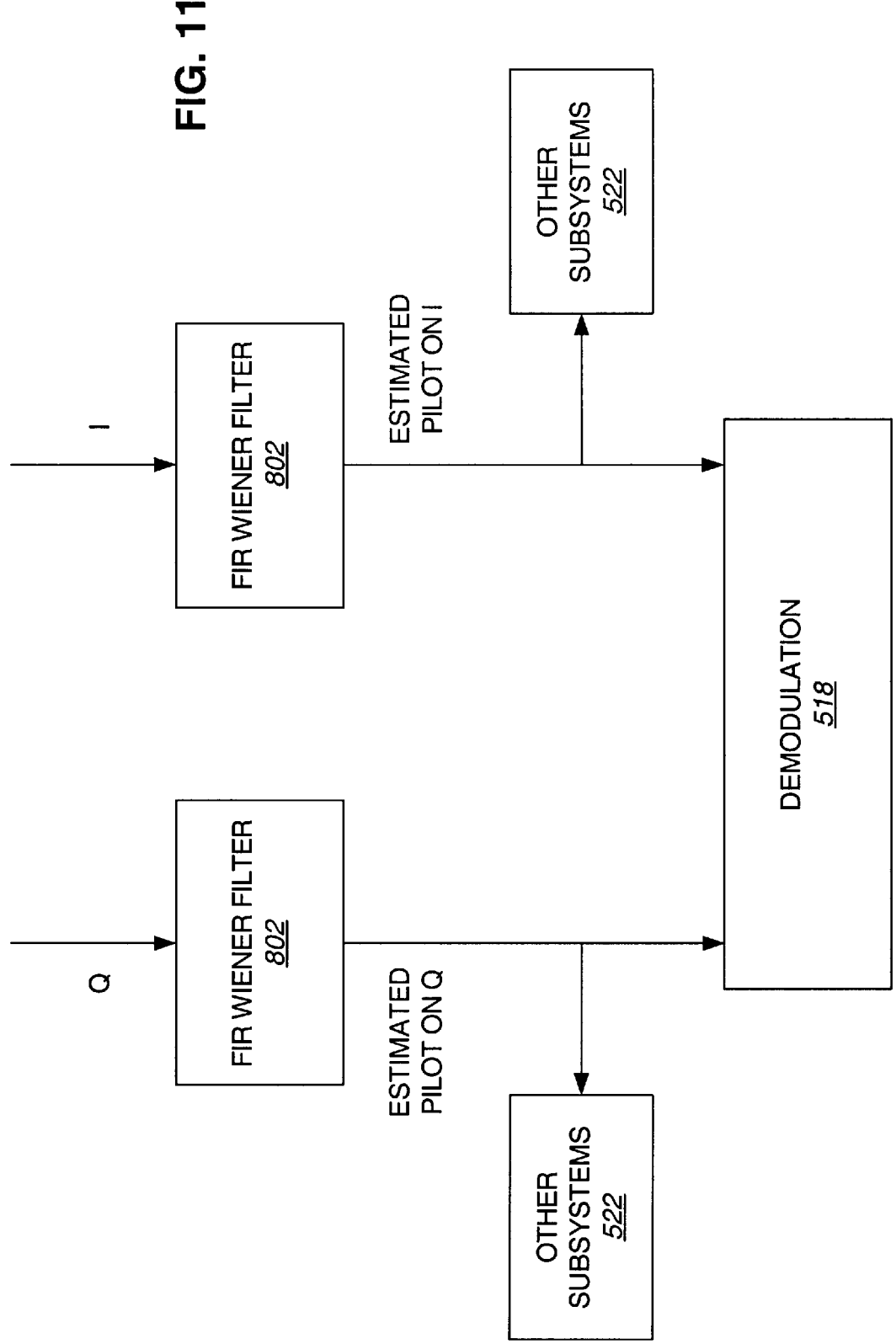
FIG. 11 is a block diagram of pilot estimation where the filtering is broken down into its I and Q components.

FIG. 11 is a block diagram of pilot estimation where the filtering is broken down into its I and Q components. As shown, the processing for the I component is similar to the processing for the Q component. The particular component is provided to the FIR Wiener filter 802. The FIR Wiener filter 802 generates an estimated pilot for that component. The pilot estimate is then provided to the demodulation component 518 as well as other subsystems 522.

Use of a Wiener filter to estimate the pilot signal may be used for many different kinds of situations. One situation where a Wiener filter may be useful is when a user is moving at high speeds. For example, if the user were aboard a bullet train his or her speed on the train may reach speeds of approximately 500 km/hr. Estimating the pilot signal using a Wiener filter in such situations may provide better results than other currently used methods.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method comprising:

receiving a CDMA signal;

despreading the CDMA signal;

obtaining a pilot signal from the CDMA signal; and estimating an original pilot signal using a Wiener filter to produce a pilot estimate;

wherein the Wiener filter was configured by an offline filter determination process;

wherein the offline filter determination vrocess comprises calculating parameters of the Wiener filter to minimize the mean-square error;

wherein the parameters of the Wiener filter are calculated according to the following formula:

$$H = R_{yy}^{-1} R_{ys}.$$

2. In a mobile station for use in a wireless communication system a method comprising:

receiving a CDMA signal;

despreading the CDMA signal;

obtaining a pilot signal from the CDMA signal; and estimating an original pilot signal using a Wiener filter to produce a pilot estimate;

wherein the Wiener filter was configured by an offline filter determination process;

wherein the offline filter determination process comprises calculating parameters of the Wiener filter to minimize the mean-square error;

wherein the parameters of the Wiener filter are calculated according to the following formula:

$$H = R_{yy}^{-1} R_{ys}.$$

3. A mobile station for use in a wireless communication system the mobile station comprising:

an antenna for receiving a CDMA signal;

a receiver in electronic communication with the antenna;

a front-end processing and despreading comoonent in electronic communication with the receiver for desoreading the CDMA signal;

a pilot estimation component in electronic communication with the front-end processing and despreading component for estimating an original pilot signal using a Wiener filter to produce a pilot estimate; and a demodulation component in electronic communication with the pilot estimation component and the front-end processing and despreading component for providing demodulated data symbols to the mobile station;

wherein the Wiener filter was configured by an offline filter determination process;

wherein the offline filter determination process comprises calculating parameters of the Wiener filter to minimize the mean-square error;

wherein the parameters of the Wiener filter are calculated according to the following formula:

$$H = R_{yy}^{-1} R_{ys}.$$

4. A mobile station for use in a wireless communication system the mobile station comprising:

means for receiving a CDMA signal;

means for despreadins the CDMA signal;

means for obtaining a pilot signal from the CDMA signal; and means for estimating an original pilot signal using a Wiener filter to produce a pilot estimate;

wherein the Wiener filter was configured by an offline filter determination process;

wherein the offline filter determination process comprises calculating parameters of the Wiener filter to minimize the mean-square error;

wherein the parameters of the Wiener filter are calculated according to the following formula:

$$H = R_{yy}^{-1} R_{ys}.$$

* * * * *